United States Patent [19]

Borner et al.

[11] Patent Number: 4,507,964

[45] Date of Patent: Apr. 2, 1985

[54] SLOW SPEED DYNAMIC WHEEL BALANCER

[76] Inventors: Willy Borner, 21096 Grenola Dr., Cupertino, Calif. 95014; Bernie F. Jackson, 23485 Summit Rd., Los Gatos, Calif. 95030

[21] Appl. No.: 444,885

[22] Filed: Nov. 29, 1982

[51] Int. Cl.$^3$ .............................................. G01M 1/22
[52] U.S. Cl. ........................................ 73/462; 73/487
[58] Field of Search .......................... 73/460, 462–465, 73/66, 459

[56] References Cited

U.S. PATENT DOCUMENTS

| | | | |
|---|---|---|---|
| 2,322,939 | 6/1943 | Inman | 73/459 |
| 2,940,315 | 6/1960 | Rued | 73/467 |
| 3,043,146 | 7/1962 | Rued | 73/462 |
| 3,076,342 | 2/1963 | Hilgers | 73/462 |
| 3,289,483 | 12/1966 | Slemmons | 73/459 |
| 4,341,119 | 7/1982 | Jackson et al. | 73/462 |
| 4,457,172 | 7/1984 | Mathes et al. | 73/462 |

*Primary Examiner*—James J. Gill
*Attorney, Agent, or Firm*—Burns, Doane, Swecker & Mathis

[57] ABSTRACT

A system for dynamically balancing a wheel utilizes low speed (preferably 50 to 100 rmp) rotation of the wheel that can if desired be provided manually. In manual operation as the rotation is imparted to the wheel by an operator, the rotational speed of the wheel is measured, and an indicator notifies the operator when sufficient rotational speed has been imparted to the wheel to enable a balancing operation to be carried out. Thereafter the wheel is allowed to coast and decelerate until the sensed forces have adequately settled out, then the forces of imbalance transmitted by the rotatable shaft are measured. When the measurements are obtained, any detected imbalance of the wheel is displayed on a suitable indicator mechanism.

37 Claims, 5 Drawing Figures

SLOW SPEED DYNAMIC WHEEL BALANCER

BACKGROUND OF THE INVENTION

The present invention relates to a method and apparatus for determining the imbalance of a rotational member, particularly a wheel, and more specifically to a method and apparatus that is capable of dynamically determining the imbalance of a rotational member in a simple and economic manner. Although it is discussed hereinafter with particular reference to the balancing of wheels, it will be appreciated that the invention is applicable to other types of rotational members, e.g. rotors or the like. It will also be appreciated that when this application refers to balancing "wheels" what is actually being balanced is usually a wheel-tire combination, and that "wheel" includes this combination.

At present, there are available two basic types of systems for determining the imbalance of a wheel having a tire mounted thereon. One of these types of systems is a static one, in which the wheel and tire remain motionless while any imbalance thereof is determined. For example, the wheel can be supported in a horizontal orientation by means of a leveling type of support device having a bubble or similar such indicator that is shifted from a central reference point in dependence upon the imbalance of the tire. By placing suitable weights at strategic points around the rim of the wheel, an operator is able to vary the position of the bubble indicator until it is brought to the reference point. Thereafter, the weights are fixed to the wheel at these strategic points.

The primary advantages of a static type of wheel balancing system lie in its simplicity and low cost. Due to its relatively simple construction and small size, it is an easily affordable system that can be found in a variety of establishments in which wheel balancing is required on a part-time basis, such as in automotive shops, service stations, and the like. However, the static type of wheel balancing system is less than totally satisfactory. Since the wheel is motionless in a static system, the imbalance that is determined basically relates only to the location of the center of gravity relative to the spin axis. However, the state of balance of the wheel is most critical when it undergoes rotation. It is only then that possibly counterbalancing centrifugal forces present on the inner and outer planes of the wheel can be detected and distinquished.

Consequently, the second type of wheel balancing system, a dynamic balancing system, has been developed to provide a more complete indication of the imbalance of a wheel and the manner in which it can be corrected. In dynamic wheel balancing systems, the wheel to be balanced is mounted on a shaft that is brought up to a desired rotational speed by means of a motor. Once the wheel attains this speed, measurements are made of the lateral movement of the shaft, or the forces generated by the shaft, due to the imbalance of the wheel. From these measurements, indications of the magnitude of the imbalance of the wheel and the location of the imbalance can be made.

Typically, the rotational speed of the wheel is 400 rpm or greater. Such a speed has been used for several reasons. For one, it is easier to measure the forces of imbalance at high speed as the magnitude of the imbalance forces increases as the square of rotational velocity. At high velocities very favorable signal/noise ratios are easily obtained.

An additional reason that these high rotational velocities have been used in the past has related to the consumer's observation that imbalanced tires are more noticeable at high highway speed than at low speeds. This has led to the generally held belief that it is necessary that wheel and tire balancing be carried out at the wheel's usual operating speed. A passenger car tire rotates at about 400 rpm at 30 mph and about 750 rpm at 55 mph.

Although the presently available high speed dynamic wheel balancing systems provide a highly accurate reading of the imbalance of a wheel, as well as the location and amount of weight necessary to correct it, they are also not without their attendant limitations. Foremost among these is the cost of such systems. One of the major contributors to this cost is the drive motor and associated heavy duty drive train that are incorporated in such systems and are necessary to bring the wheel up to the measuring speed heretofore deemed appropriate.

Furthermore, the high speed at which the wheel is rotated during the balancing operation presents a number of safety hazards that must be compensated. For example, industry practice requires that wheel balancers of this type have a protective hood mechanism that covers a substantial portion of the wheel while it is rotating, to eliminate the hazards caused by objects that are trapped within the treads of the tire being loosened and flying off, and thereby injuring someone. The hood also lessens the likelihood that the operator of the balancing mechanism will get his hands, hair or clothes caught in the wheel or on the treads and thereby be injured during the rotation of the wheel, or that the wheel will come off. This hood also has an interlock which prevents the balancer from operating unless it is firmly seated. In addition to the hood, it is also necessary to provide a brake on the balancing machine that is of sufficient strength to stop the wheel quickly, even at high rotational speeds, before the hood can be lifted.

All of the components that are required to make up a dynamic wheel balancing system of the type that is presently commercially available result in a machine that is quite large in size. Since the forces generated at high speeds can be very large these machines are heavily weighted and/or bolted to the floor. This is also needed for safety. They are not generally considered to be portable in nature. The complexity of heretofore known dynamic balancing machines renders the serviceability of such machines much more difficult. The wear occasioned by the high operating speeds and the need to be able to quickly decelerate the rotating wheels increases the frequency of required maintenance, thereby also increasing the real cost of such machines.

OBJECTS AND SUMMARY OF THE INVENTION

It is therefore a general object of the present invention to provide a novel method and apparatus for determining the imbalance of a wheel or the like that is capable of operating with the accuracy of other dynamic wheel balancers but without their attendant limitations.

It is another object of the present invention to provide a novel apparatus for dynamically determining imbalance of a wheel that is simple in construction, and therefore inexpensive.

It is yet another object of the present invention to provide a novel method and apparatus that is capable of dynamically determining the imbalance of a wheel at a relatively low speed, to thereby substantially reduce the cost and safety hazards associated with high speed balancing operations.

It is a further object of the present invention to provide a novel wheel balancing system that is both readily portable and easily serviced.

In accordance with these and other objects, the present invention provides a novel wheel balancing system that is capable of determining the imbalance of a wheel at a rotational speed much lower than deemed necessary heretofore. It has now been found that the rotational velocity required to effectively balance a wheel-tire assembly can be less than 180 rpm, and preferably can be in the range of 50–100 rpm. It has also been found that this relatively low rotational velocity need not be maintained constant during the balancing period but can vary, and thus the wheel can be coasting in these velocity ranges during balancing. It has been further discovered that since these low speeds are employed, it is possible to eliminate the motor and its associated drive train used heretofore and rely upon manual rotation by the system operator. Thus, in accordance with the preferred principles of the present invention, the wheel to be balanced is mounted on a rotatable shaft, and rotation is manually imparted thereto by means of the system operator. Such rotation can be provided, for example, by physically grasping the periphery of the wheel, e.g. its treads, and providing circumferential thrust to turn the wheel, or by rotating a hand crank or other suitable mechanism attached to the wheel or to the shaft.

In manual operation, as the rotation is imparted to the wheel by the operator, the rotational speed of the wheel is measured, and preferably an indicator notifies the operator when sufficient rotational speed has been imparted to the wheel to enable a balancing operation to be carried out, i.e. 50–180 rpm. Once the wheel has been brought up to the proper initial speed, it is thereafter allowed to coast and decelerate until the force signals settle adequately at which time the forces of imbalance transmitted by the rotatable shaft are measured. After the measurements are obtained, a second indication can be given and the wheel can be stopped, either manually or by means of a brake attached to the balancing mechanism. Any measured imbalance of the wheel is displayed on a suitable indicator mechanism. Based upon the displayed information, the operator can attach weights to the wheel at appropriate points to balance it about its axis of rotation.

The present invention with its low speed operation offers advantages of lower cost, and lower maintenence both in terms of systems such as motor drives that can be eliminated and also in terms of systems that can be significantly downsized or downgraded because of the decreased loads they carry. In addition, it offers a major reduction in hazards and safety equipment requirements. A wheel rotating at 90 rpm in only revolving 1½ times a second. This poses no substantial hazard. Thus, no hoods or safety interlocks are required.

Although the manually powered, coasting configuration is preferred because of its simplicity, it can be seen that a small motor might be incoporated while still realizing most of the cost, safety and service advantages of the present invention. Similarily, though more involved, one could employ a controlled constant slow velocity instead of the decreasing velocity of the coasting mode of operation.

The manner in which the present invention achieves the foregoing objects and their attendant advantages will be more fully appreciated upon a perusal of the following detailed description of a preferred embodiment of the invention illustrated in the accompanying drawings.

DETAILED DESCRIPTION OF THE PREFERRED EMBODIMENT

Referring to FIGS. 1–4 of the application, the wheel balancer illustrated therein includes a frame 10 that provides suitable structural support for all of the mechanical and electrical components of the balancer. The frame 10 basically comprises an elongated tube having a generally square or rectangular cross section. A tubular housing 12 is suspended from the top wall of the frame 10 in a manner such that it can transmit forces in one direction only. The support mechanism for the housing 12 includes a pair of metal strips 14 that are sufficiently flexible to allow freedom of movement in one horizontal direction, i.e. left to right and right to left as viewed in FIG. 2. The metal strips are sufficiently rigid so as not to undergo elastic compression or stretching, and thereby inhibit movement of the housing 12 in a vertical direction. In addition, the strips 14 are rigidly attached to both the frame 10, by means of bolts 16, and to the housing 12, by means of bolts 18, so that they are not pivotable in a vertical plane, thereby inhibiting movement of the frame in a longitudinal direction, i.e. from left to right and from right to left as viewed in FIGS. 3 and 4. Additional support for the housing 12 is provided by a vertical rod 19 that is attached to the side of the housing opposite the strips 14 and that allows the necessary freedom of movement of the housing.

Figure 3:
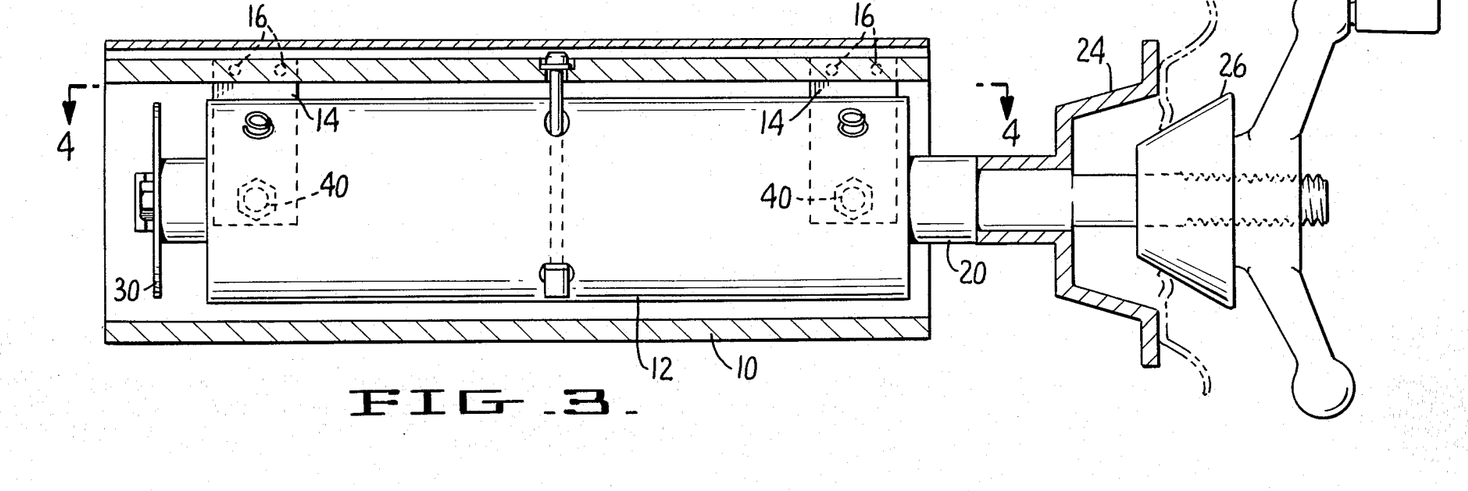
FIG. 3 is a cross-sectional side view of the shaft and its support mechanism.
Figure 4:
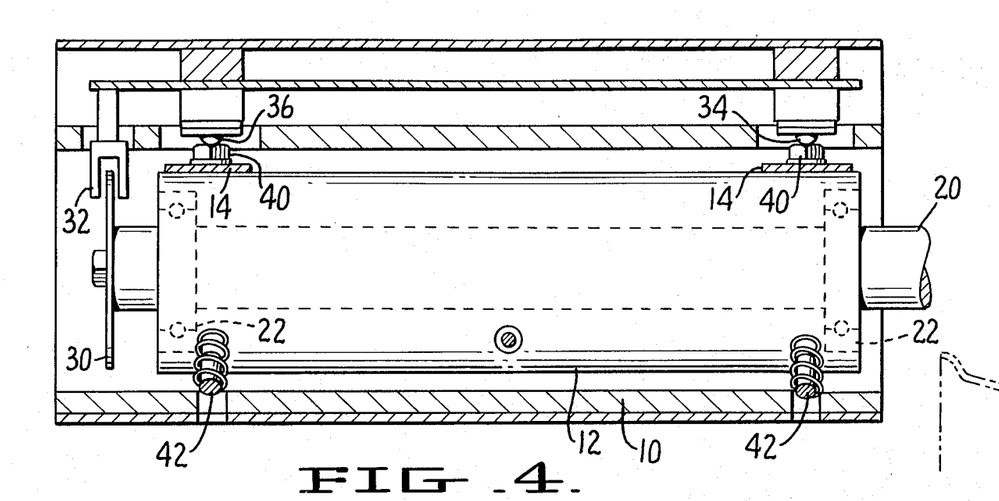
FIG. 4 is a cross-sectional top view of the shaft and its support mechanism.

A shaft 20 is suitably journalled for rotation in the housing 12 by means of bearings 22. A mounting flange 24 is attached to one end of the shaft 20 and provides a suitable support surface against which a wheel to be balanced (shown in phantom) abuts when mounted on the shaft 20. A frustoconical hub mechanism 26 can be threaded onto the shaft 20 to lock the wheel to be balanced in place, as best illustrated in FIG. 3. The hub 26 can include one or more handles 28 to facilitate attachment to the shaft. The handles 28 are preferrably symmetrically located around the hub so as to be balanced with respect to the axis of the shaft, and thereby not adversely affect the imbalance measurement.

A timing disc 30 is mounted on the other end of the shaft 20. The disc 30 has a number of slots located around its periphery that cooperate in a well known manner with an electro-optical encoder 32 to provide an electrical pulse signal related to the rotational speed of the disc 30, and hence the shaft 20.

Figure 1:
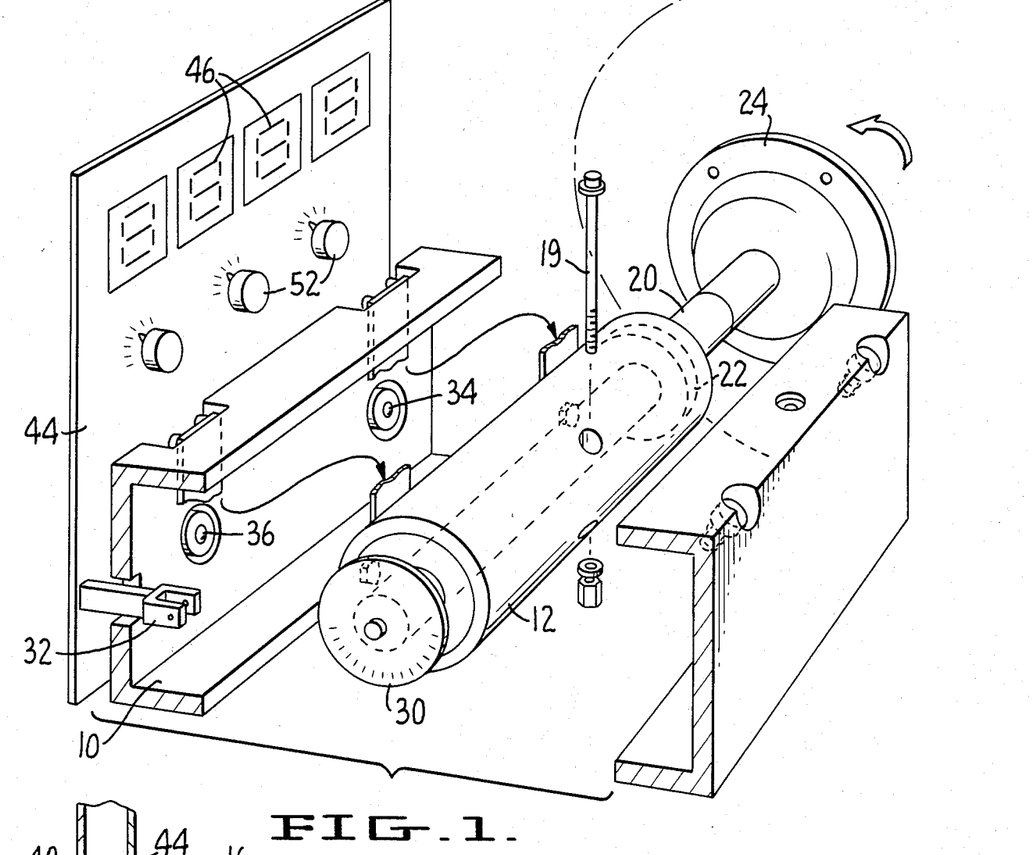
FIG. 1 is a perspective view of a manually operated wheel balancing apparatus constructed in accordance with the principles of the present invention.
Figure 2:
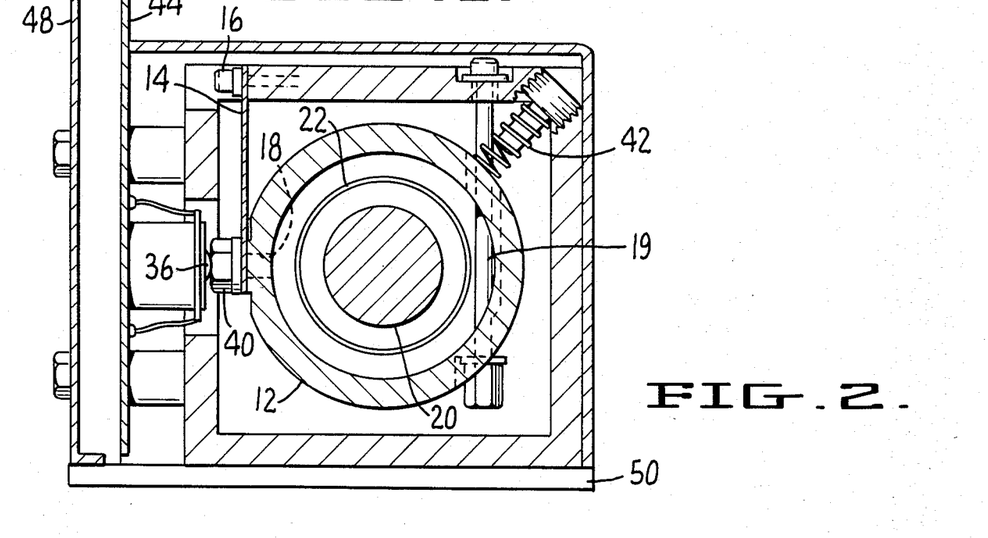
FIG. 2 is a cross-sectional end view of the rotatable shaft, its support mechanism, and the sensor elements.

Lateral forces generated by the shaft 20 during its rotation, which are caused by imbalance in a wheel being measured, are sensed by piezoelectric transducers 34 and 36 that project through one of the side walls of the frame 10 and engage the housing 12. The base of housing 12 can be provided with bosses 40 that project from the side thereof and insure that the housing engages only the transducer elements 34 and 36 and does not rest against any other part of the frame 10. These bosses could be formed by the bolts 18, for example. The housing is biased both downwardly and laterally into engagement with the transducers by means of a pair of spring loaded pins 42 that are attached to the frame 10 and engage the housing 12, as best illustrated in FIG. 2.

As is well known in the art of dynamic tire balancing, the transducers for sensing the lateral movement of the rotational shaft due to the imbalance of the wheel should be positioned at two spaced locations along the length of the shaft, so as to essentially measure the pivoting of the shaft about a vertical axis through its center.

In accordance with another feature of the present invention, both the timing encoder 32 and the transducers 34 and 36 are mounted on a single printed circuit board 44 that also supports and appropriately interconnects all of the other electronic components for the wheel balancer. These electronic components include a suitable conventional circuit that correlates the output signals of the transducers with information related to their location relative to the inner and outer rims of the wheel to be balanced, as well as the rotational position of the wheel, and provides an indication of the measured imbalance of the wheel. This information can be indicated on suitable display devices 46 that are also mounted on the printed circuit board 44. This type of support arrangement for the transducers, the timing encoder and all of the other electronic components provides a simple mechanism that is easy to construct and maintain. In addition, by virtue of the fact that all of the electrical components are mounted and interconnected on the same board, rather than having some of the components mounted on a separate support structure that is connected to the printed circuit board 44 by means of wires, the need to calibrate between such separate assemblies is eliminated. Thus, the manufacturing operation is further simplified and the reliability of the measurement system is increased while simultaneously minimizing required upkeep. The circuit board 44 can be mounted on the frame 10, or can be attached to an outer cover 48 for the balancer. This entire assembly can be supported on a suitable base 50, for example a pedastal type base, that positions the shaft and the other structure of the wheel balancer at a suitable height above the floor, a workbench or the like.

In operation, the wheel to be balanced is mounted on the mounting plate 24 and secured thereto by means of the hub 26. The operator enters information related to the spacing of the transducers from the inner rim of the wheel being measured, as well as the spacing between the inner and outer rims of the wheel and its diameter. Typically, this information can be empirically determined based upon standard wheel sizes and the mechanism for entering such information, for example potentiometers 52, can be calibrated in accordance with standard wheel sizes. Once the appropriate information has been entered, the wheel is set in motion by manually grasping it and imparting a rotational force thereto. As an alternative to grasping the wheel itself, it is feasible to grasp one of the handles 28 on the hub and utilize it essentially as a crank to rotate the wheel. It is also possible to provide a separate handle 59 attached to the hub or to the shaft itself to enable such rotation to be manually imparted. However, care should be taken to ensure that the handle be symmetrically balanced around the rotational axis of the shaft so as not to adversely affect the imbalance readings.

In accordance with the present invention, the speed at which the wheel rotates due to the manually imparted motion is substantially less than that utilized in prior types of dynamic balancers. This speed is less than 180 revolutions per minute, and most preferably in the range of 50 to 100 rpm. It has been determined that a rotational speed in this range can be easily imparted to a wheel of any practical size with minimal effort by an operator of average strength. As noted previously, it is within the perview of this invention to drive the wheel to the required velocity mechanically as long as the velocity is within these particular ranges.

In order to obtain maximum possible accuracy in the measurement of the imbalance of the wheel, it is desirable to have the wheel rotating at the optimum speed for which the electronic measuring circuit is designed. This design parameter is typically influenced by the center frequency of the bandpass filters in a measuring circuit that receives the output signals from the transducer elements. It is desirable to provide an indication to the operator when the rotational speed of the wheel has reached an adequate value, i.e. a value slightly greater than this optimum level. For example, if the optimum speed for which the measuring circuit is designed is 90 revolutions per minute, the display circuit on the circuit board 44 can provide an indication when the speed of the wheel gets up to a point slightly greater than this speed. Such an indication can be provided by blinking the numerical indicators 46, or by providing a separate indicator such as a light and/or an audible signal that is dedicated to this function. Once the operator receives the indication that the proper speed has been attained, he should stop imparting rotational force to the wheel.

Typically, by the time the operator receives the speed indication, and ceases to impart any further force to the wheel, the actual speed of the wheel will be substantially above the measuring speed. However, once the operator ceases to turn the wheel, it will begin to coast and slow down. In order to increase the rate of deceleration of the wheel to bring it back down to the optimum measuring speed within a reasonable time period, it may be desirable that the drag on the shaft 20 be controlled in any suitable manner. As the speed of the wheel decreases, it will reach the optimum measuring velocity, at which point the measuring circuit will be actuated to sense the output signals from the transducers 34 and 36 and calculate the location and magnitude of the wheel imbalance in a well known manner. This calculated information can be displayed on the numerical indicators 46.

Figure 5:
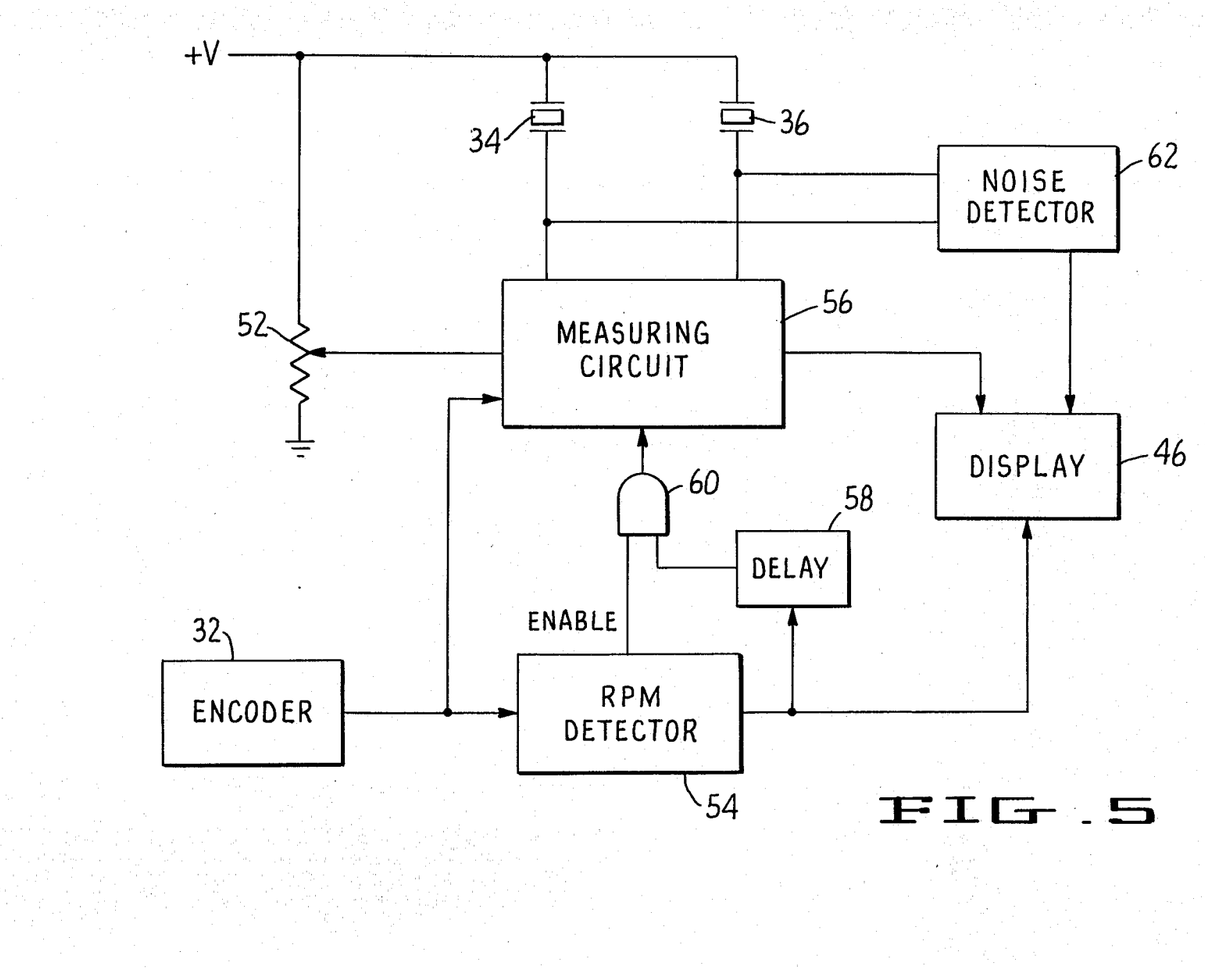
FIG. 5 is a schematic block diagram of the electrical circuit portion of the wheel balancer.

A circuit for providing the necessary indications is illustrated in block diagram form in FIG. 5. The pulsed output signal from the timing encoder 32 is fed to a velocity detector circuit 54. This circuit detects when the rotational velocity of the wheel has reached sufficient speed to enable mesurement of the forces of imbalance to be carried out. This speed can be the same as the predetermined measuring speed, e.g. 90 rpm, or it can be slightly higher to provide adequate coasting time for the system to have settled when reaching the measuring speed. When the proper initial speed is detected, the circuit 54 produces an output signal that is provided to the display circuit 46 to indicate to the operator that it is no longer necessary to continue turning the wheel.

Thereafter, when the force signals have adequately settled the circuit provides a second output signal. This signal enables a measuring circuit 56 to receive the input signals from the transducers 34 and 36 and the wheel size information entered by way of the potentiometers 52, and to provide an output signal to the display circuit 46 to indicate the measured imbalance of the wheel. The measuring circuit 56 can be any suitable conventional circuit for calculating the size and the location of counterweights to be attached to the wheel to place it in proper balance, based upon input information from the transducers and the encoder. Examples of circuits of this type are disclosed in U.S. Pat. Nos. 3,732,737 and 3,902,373. The magnitude of the imbalance forces is a function of the rotational velocity of the wheel. In one embodiment of this invention this factor is reduced to a constant by carrying out the measurement of the forces at exactly a predetermined speed—i.e. the actual measuring speed is equal to the nominal measuring speed. In another embodiment, the actual measuring speed can vary from the nominal speed by as much at ±10, 15 or even 20%. In this case, it is desirable to correct the measured forces. This can be done by simply multiplying measured force by a correction factor equal to $$\left(\frac{\text{nominal measuring velocity}}{\text{actual measuring velocity}}\right)^2$$

Generally, there is a time lapse between the point at which the operator ceases to rotate the wheel and the point at which the speed of the wheel decreases to the optimum measuring value. This lapse will normally be sufficient to enable any transients in the measuring process that might be introduced by the motion of the operator as he turns the wheel, or the like, to settle out. However, where the initial indicated speed is the same as the measuring speed, it is possible that the operator could cease imparting motion to the wheel at precisely the measuring speed, or at a speed just slightly greater than the desired measuring speed. In such a situation, it is desirable to provide a time delay between the time that the indication is provided to the operator that it is no longer necessary to impart force and the time that measurement takes place, so that any transients in the system have sufficient time to settle. Referring to the circuit diagram of FIG. 5, a delay circuit 58 is responsive to the signal to the display circuit indicating that sufficient speed has been attained. The delay circuit produces a signal that is fed to one input terminal of an AND gate 60 a suitable settling time after receipt of the speed signal. The other input terminal of the AND gate 60 receives the enabling signal from the detector circuit 54, and provides an input signal to the measuring circuit 56. With an arrangement such as this, an enabling signal is not provided to the measuring circuit until at least the predetermined settling time after the indication is produced to cease rotating the wheel.

The length of a settling time that is sufficient to dampen all transients can be suitably determined by empirical methods, and might be in the neighborhood of 4 seconds, for example. In the example in which the optimum measuring speed is 90 rpm, if the operator rotates the wheel to an initial speed of 91 rpm, for example, the detector circuit 54 will provide the enabling signal to actuate the measurement circuit when it detects that the speed of the wheel has decreased to 90 revolutions per minute. However, if the time it takes the wheel to decrease to this speed is less than the length of the predetermined settling time, the delay circuit 58 will not allow the measuring circuit to be actuated until the settling time has elapsed. Therefore, the actual measurement might not take place until the motion of the wheel has decreased to a speed of 87 rpm, for example. However, such a speed is still sufficiently close to the optimum measuring speed to enable an accurate reading to be taken. If more distant, the measured rotational velocity could be corrected for as noted.

Alternatively, the period required to settle the system can be determined by actual measurements of transients in the measuring process. In this method, the imbalance forces are measured on successive revolutions of the shaft and the difference in forces determined on successive revolutions is determined. When this difference has dropped to less than 10% of the total, and preferably to less than 5% an enabling signal can actuate the measurement circuit to measure forces for purposes of determining the wheel's imbalance.

If desired, the display circuit 46 can also provide an indication when the measurement of wheel imbalance has been completed. Once this indication has been provided the rotation of the wheel can be stopped, for example by manually grasping it or by actuating a suitable brake mechanism (not shown) that operatively engages the shaft. Once the rotation of the wheel is stopped, the operator can utilize the information on the display 46 to attach weights to the wheel at appropriate points to bring it in balance.

In order to prevent a possibly incorrect measurement from being utilized, it may be desirable to inhibit display of the measurement when a substantial amount of noise is detected in the system. To this end, a suitable noise detector 62 can be connected to receive the output signals from the transducers. This noise detector can be a frequency responsive circuit that detects signals having a frequency outside of a limited bandwidth centered about the operational frequency of the system. When such noisy signals are detected, the noise detector 62 can provide an output signal that inhibits the display of measurement information on the display 46, or it can provide a suitable form of error signal. Thus when noise, for example due to vibration of the machine, or low frequency noise, for example due to premature braking of the wheel, is present the operator will not be provided with measurement information that could lead to incorrect placement of the coun- terweights.

From the foregoing, it will be appreciated that the present invention provides a simple and effective method and apparatus for dynamically determining the imbalance of a wheel. Among other factors, this simplicity is achieved by effectively utilizing rotation of the wheel at a maximum operating speed that is substantially less than the speeds heretofore required in such systems. Consequently, the need for bulky and expensive drive mechanisms to bring the wheel up to high speeds is eliminated. Furthermore, the relatively low operational speed of the apparatus contributes to its simplicity by also eliminating the need for safety features such as wheel covering hoods and switches that were heretofore necessary to insure that the operator was protected from the high speed rotation of the wheel. The simplicity of a wheel balancer constructed in accordance with the manual drive principles of the present invention results in an inexpensive machine that can be easily afforded by individuals who might normally expect to perform wheel balancing operations only on a part-time basis, and it is therefore not limited in practical application to professional establishments that require continuous use of a wheel balancer, although it is quite feasible for use in such establishments.

In addition to decreased costs, the relative simplicity and small size of the machine also lend to its portability. Moreover, with a manually-powered device the greatest consumer of electrical energy in prior balancing machines, i.e. the electric motor, has been eliminated. The power requirements of such a wheel balancer of the present invention are substantially diminished, particularly in light of the fact that all of the electrical components can be electronic elements having low power ratings. Consequently, it is feasible to operate the balancer of the present invention with a portable power source, such as a 6 or 12 volt storage battery, rather than requiring that it be supplied with high voltage alternating current as is now the practice.

The present invention can be embodied in other specific forms without departing from the spirit or essential characteristics thereof. The presently disclosed embodiment is therefore considered in all respects to be illustrative and not restrictive. The scope of the invention is indicated in the appended claims, rather than the foregoing description, and all changes and equivalents that come within the scope of such claims are intended to be embraced therein.

What is claimed is:

1. A method for dynamically determining the imbalance of a combined wheel and tire for a motor vehicle, comprising the steps of:
   mounting the wheel on a rotatable shaft;
   manually effecting rotation to the wheel and the shaft to inpart a velocity no greater than 180 rpm;
   allowing wheel and shaft to coast and slow down;
   measuring forces transmitted by the shaft while said shaft and wheel are coasting at a measuring velocity no greater than 180 rpm;
   determining imbalance data related to the measured forces; and
   displaying the imbalance data.

2. The method of claim 1 wherein the wheel and shaft are allowed to coast and slow down prior to and during said measuring forces step.

3. The method of claim 1 wherein the forces transmitted by said shaft are measured at two spaced locations along the length of said shaft.

4. The method of claim 3 wherein both static and dynamic forces of imbalance at the inner and outer planes of the wheel are determined from said two measurements.

5. A method for dynamically determining the imbalance of a combined wheel and tire for a motor vehicle, comprising the steps of:
   mounting the wheel on a rotatable shaft that is constrained for movement in at most one radial plane;
   manually effecting rotation to the wheel and the shaft to impart a velocity greater than 50 rpm but less than 100 rpm;
   measuring forces transmitted by the shaft at said velocity greater than 50 rpm but less than 100 rpm;
   determining imbalance data related to the measured forces; and
   displaying the imbalance data.

6. The method of claim 5 wherein the forces transmitted by said shaft are measured at two spaced locations along the length of said shaft.

7. A method for dynamically determining the imbalance of a combined wheel and tire for a motor vehicle, comprising the steps of:
   mounting the wheel on a rotatable shaft;
   manually rotation to the wheel and the shaft;
   allowing the wheel and shaft to coast and slow down to a rotational velocity in the range of from 50 to 100 rpm during a settling period;
   measuring the forces of imbalance tramsmitted by the shaft at the termination of settling period;
   determining imbalance data related to the measured forces; and
   displaying the imbalance data.

8. The method of claim 7 wherein said settling period is of a predetermined set length.

9. The method of claim 7 wherein said settling period is the time it takes the wheel and shaft to slow down to a predetermined measuring speed.

10. The method of claim 7 wherein said settling period is the time it takes the measured forces to settle as determined by the difference in signals measured on successive revolutions of the shaft.

11. The method of claim 7 wherein said measuring of forces of imbalance is carried out at a nominal measuring velocity.

12. The method of claim 7 wherein said measuring of forces of imbalance is carried out at an actual measured rotational velocity that is within 20% of the nominal measuring velocity and wherein during the determining imbalance data step the forces measured are adjusted by being multiplied by the factor $$\left(\frac{\text{nominal measuring velocity}}{\text{actual measuring velocity}}\right)^2.$$

13. The method of claim 12 wherein said rotational velocity is in the range of 50 to 100 rpm.

14. The method of claim 12 wherein the forces transmitted by said shaft are measured at two spaced locations along the length of said shaft.

15. The method of claim 12 wherein said sensory perceptible indication is an audible signal.

16. The method of claim 12 wherein said sensory perceptible indication is a visual signal.

17. The method of claim 12 wherein said settling period is a predetermined set length.

18. The method of claim 12 wherein said settling period is the time it takes the wheel shaft to slow down to a predetermined measuring speed.

19. The method of claim 12 wherein said settling period is the time it takes the measured forces to settle as determined by the difference in signals measured on successive revolutions of the shaft.

20. The method of claim 12 wherein said measuring of forces of imbalance is carried out at a nominal measuring velocity.

21. The method of claim 12 wherein said measuring of forces of imbalance is carried out at an actual measured rotational velocity that is within 20% of the nominal measuring velocity and wherein during the determining imbalance data step the forces measured are adjusted by being multiplied by the factor $$\left(\frac{\text{nominal measuring velocity}}{\text{actual measuring velocity}}\right)^2$$

22. A machine for determining the imbalance of a wheel, comprising:
- a rotatable shaft adapted to support a wheel to be balanced;
- means for enabling rotation to be manually imparted to said shaft;
- means for measuring the rotational speed of said shaft;
- means for providing a sensory perceptible indication when said shaft reaches a predetermined actuating speed;
- means for measuring forces of imbalance transmitted by said shaft at a measuring rotational speed of 50 to 180 rpm at the termination of a settling period after a sensory perceptible indication is provided; and
- means for displaying imbalance data related to the measured forces.

23. The machine of claim 22 wherein said force measuring means includes at least two force sensitive transducers respectively located at two spaced locations along the length of said shaft, and an apparatus for supporting said shaft that is biased into engagement with said transducers.

24. The machine of claim 23 wherein said speed measuring means includes an indicator wheel mounted on said shaft and means for sensing rotation of said indicator wheel, and wherein said sensing means and said transducers are mounted on a common circuit board.

25. The machine of claim 24 wherein said indicating means and said display means are also mounted on said circuit board.

26. The machine of claim 22 wherein said measuring rotational speed is in the range of 50–100 rpm.

27. The machine of claim 26 further including means for detecting noise related to said actuating speed and for providing an indication when such noise is detected.

28. The machine of claim 27 wherein said indication comprises inhibition of operation of said display means.

29. In a dynamic wheel balancing machine wherein a wheel to be balanced is rotated at a predetermined speed and forces of imbalance generated by the wheel at said speed are measured, the improvement wherein the predetermined speed is less than 180 rpm and the wheel is manually rotated to bring it up to said predetermined speed.

30. The method of claim 29 further wherein the wheel is allowed to coast after it reaches said predetermined speed, and said forces are measured while the wheel is coasting.

31. The method of claim 30 wherein said speed is from 50 to 180 rpm.

32. A machine for dynamically determining the imbalance of a combined wheel and tire for a motor vehicle, comprising:
- a rotatable shaft adapted to support a wheel to be balanced;
- means for measuring the rotational speed of said shaft;
- means for providing a sensory perceptible indication when said shaft reaches a predetermined actuating speed that is less than 180 revolutions per minute;
- a force transducer for measuring centrifugal forces generated at one point along said shaft while said shaft is rotating at a measuring speed related to said catuating speed;
- means for determining imbalance data related to the measured forces; and
- means for displaying the determined imbalance data.

33. The machine of claim 32 further including a second force transducer for measuring centrifugal forces generated at a second point along said shaft.

34. The machine of claim 32 wherein said actuating speed is in the range of 50–100 revolutions per minute.

35. The machine of claim 32 wherein said measuring speed is less than 180 revolutions per minute.

36. The machine of claim 35 wherein said measuring speed is in the range of 50–100 revolutions per minute.

37. The machine of claim 32 wherein said shaft is constrained to move in at most one radial plane.

* * * * *

UNITED STATES PATENT AND TRADEMARK OFFICE
CERTIFICATE OF CORRECTION

PATENT NO. : 4,507,964

DATED : April 2, 1985

INVENTOR(S) : Borner et al.

It is certified that error appears in the above—identified patent and that said Letters Patent is hereby corrected as shown below:

On the title page: "37" Claims should read --38 Claims--.

In claim 1, at Column 9, line 38, change "inpart" to --impart--.

In claim 7, at Column 10, line 8, after "manually" insert --imparting--.

At Column 12, line 44, insert the following claim:

--38. A method for dynamically determining the imbalance of a combined wheel and tire for a motor vehicle, comprising the steps of:

mounting the wheel on a rotatable shaft;

manually imparting rotation to the wheel and the shaft;

providing a sensory perceptible indication when the wheel and the shaft reach a predetermined speed;

allowing the wheel and shaft to coast and slow down to a rotational velocity less than 180 rpm during a settling period;

measuring the forces of imbalance transmitted by the shaft at the termination of said settling period;

UNITED STATES PATENT AND TRADEMARK OFFICE
CERTIFICATE OF CORRECTION

PATENT NO. : 4,507,964
DATED : April 2, 1985
INVENTOR(S) : Borner et al.

It is certified that error appears in the above—identified patent and that said Letters Patent is hereby corrected as shown below:

determining imbalance data related to the measured forces; and     displaying the imbalance data.--

In the first line of each of claims 13-21, change "12" to --11--.

*Signed and Sealed this*

*Twenty-fourth* Day of *September 1985*

[SEAL]

*Attest:*

*Attesting Officer*

DONALD J. QUIGG

*Commissioner of Patents and Trademarks—Designate*

UNITED STATES PATENT AND TRADEMARK OFFICE
CERTIFICATE OF CORRECTION

PATENT NO. : 4,507,964

DATED : April 2, 1985

INVENTOR(S) : Borner et al.

It is certified that error appears in the above-identified patent and that said Letters Patent is hereby corrected as shown below:

Column 10:
    In the first line of each of claims 13-21, change "12" to --38--, and disregard the change to "11" listed on the Certificate of Correction dated September 24, 1985.

At line 29 of column 12 change "catuating" to --actuating--.

Signed and Sealed this

Twentieth Day of October, 1992

Attest:

DOUGLAS B. COMER

*Attesting Officer*      Acting Commissioner of Patents and Trademarks